United States Patent [19]
Huang

[11] Patent Number: 5,579,252
[45] Date of Patent: Nov. 26, 1996

[54] COMPUTER MONITOR POWER-SAVING DEVICE

[76] Inventor: Jen S. Huang, 3FL. No. 276-2, Ta-Tung Road, Sec. 1, Hsi-Chih City, Taipei Hsien, Taiwan

[21] Appl. No.: 309,176

[22] Filed: Sep. 20, 1994

[51] Int. Cl.$^6$ .................................................. G06F 1/00
[52] U.S. Cl. ................................................. 364/707
[58] Field of Search ................................ 364/707, 807; 395/750

[56] References Cited

U.S. PATENT DOCUMENTS

| | | | |
|---|---|---|---|
| 4,419,917 | 12/1983 | Sato | 364/707 |
| 4,665,536 | 5/1987 | Kim | 364/707 |
| 4,825,143 | 4/1989 | Cheng | 364/707 |
| 5,214,785 | 5/1993 | Fairweather | 364/707 |
| 5,335,168 | 8/1994 | Walker | 364/707 |
| 5,371,693 | 12/1994 | Nakazoe | 364/707 |
| 5,375,245 | 12/1994 | Solhjell et al. | 364/707 |
| 5,384,579 | 1/1995 | Nakasuji et al. | 364/707 |
| 5,384,721 | 1/1995 | Joto | 364/707 |

OTHER PUBLICATIONS

"Auto turn–off monitors", Nutek 1992, pp. 1–4.

*Primary Examiner*—Tan V. Mai
*Attorney, Agent, or Firm*—Beveridge, DeGrandi, Weilacher & Young, L.L.P.

[57] ABSTRACT

A computer monitor power-saving device is used to switch off the power to the monitor when it detects that the input devices of the computer as mouse or keyboard has been idle for a preset time duration. The monitor will be switched on again when the device detects inputs from the mouse or keyboard. This device provides the benefits of prolonging the life of the monitor and saving precious energy.

7 Claims, 2 Drawing Sheets

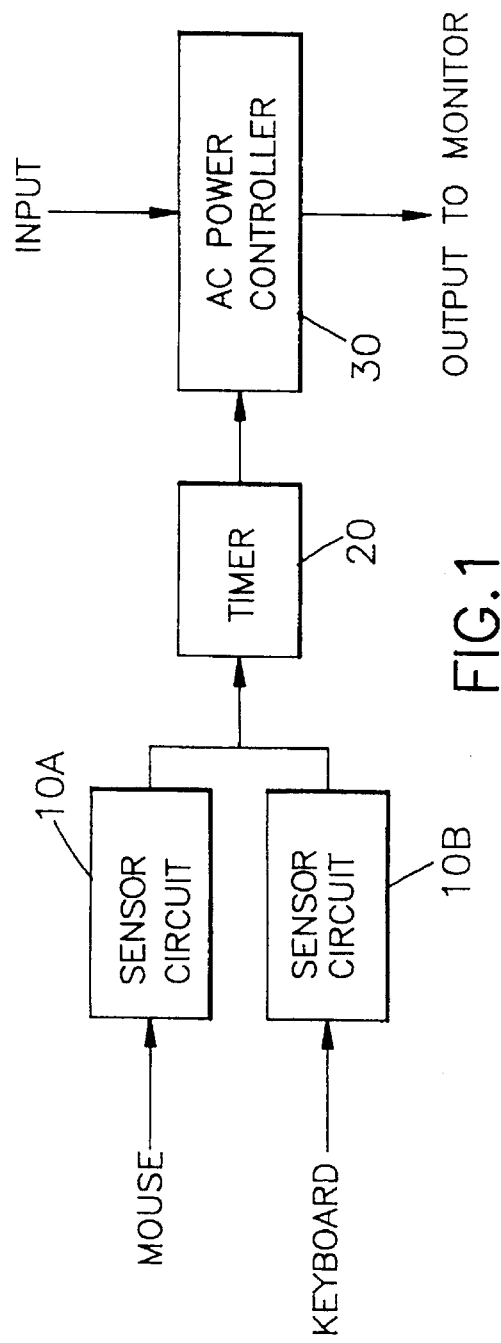
FIG. 1
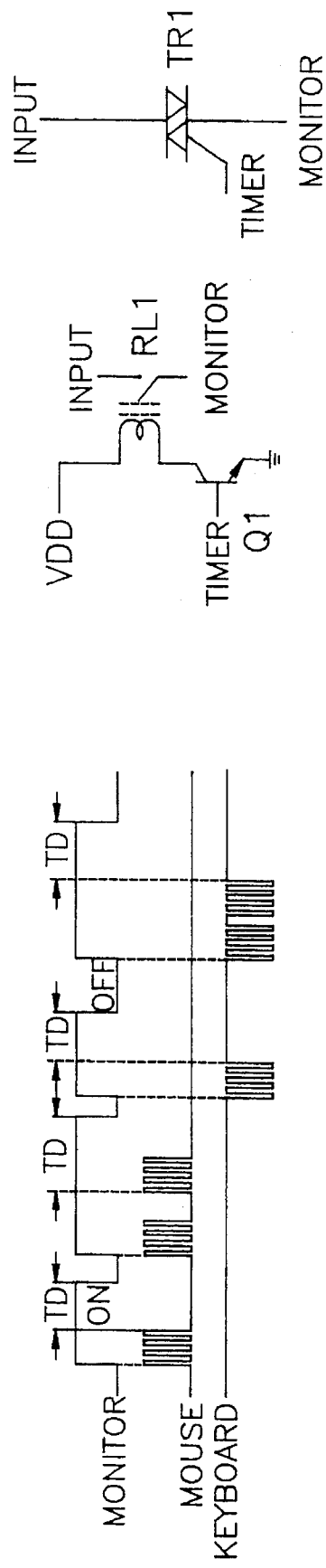
FIG. 2
FIG. 3A
FIG. 3B 5,579,252

COMPUTER MONITOR POWER-SAVING DEVICE

BACKGROUND OF THE INVENTION

The present invention relates to a computer monitor power-saving device capable of switching the screen display off when not in use.

In the fast-growing information age, computers are more and more becoming indispensable tools for almost all works of life. Such large numbers of in-use computers consume great amounts of electricity.

According to recent surveys, computers are in an idle state for quite a large percentage of the time after they are powered on. Users often leave the computer for other jobs with the power still on. Technical survey shows that when the computer is idle, the monitor consumes most of the power while the CPU only takes a small portion. This is because the CRT of the monitor needs high-voltage to emit electrons to the screen. Therefore, switching off the monitor while the computer is idle will save power but will not halt the CPU and volatile unsaved data.

Accordingly, there exists a need for a device which is capable of automatically switching off the power to the monitor when the user leaves the computer for a short while and no input is sent into the computer. With such a device, energy will be significantly saved.

SUMMARY OF THE INVENTION

It is therefor a primary objective of the present invention to provide a computer monitor power-saving device capable of switching off the input power to the monitor when it detects that the computer input devices are idle for a long time period.

In accordance with the foregoing and other objectives, a computer monitor power-saving device is provided. The power-saving device includes an input detecting device for detecting if signal is being input to the computer. A timer is coupled to the input detecting device and preset with a fixed time setting. A power controller is coupled to the timer, capable of switching off input power to the computer monitor after no input signal has been detected by the input detecting device after the time setting of the timer.

BRIEF DESCRIPTION OF THE DRAWINGS

The present invention can be more fully understood by reading the subsequent detailed description of the preferred embodiments thereof with references made to the accompanying drawings, wherein:

FIG. 1 is a schematic circuit block diagram of a preferred embodiment of the present invention;

FIG. 2 is a signal diagram showing the waveform of pulses transmitted between the screen and the mouse and keyboard;

FIG. 3A is a circuit diagram of the screen power controller employed in the first embodiment of the present invention;

FIG. 3B is another circuit diagram of the screen power controller employed in the second preferred embodiment of the present invention.

DETAILED DESCRIPTION OF THE PREFERRED EMBODIMENTS

Figure 4:
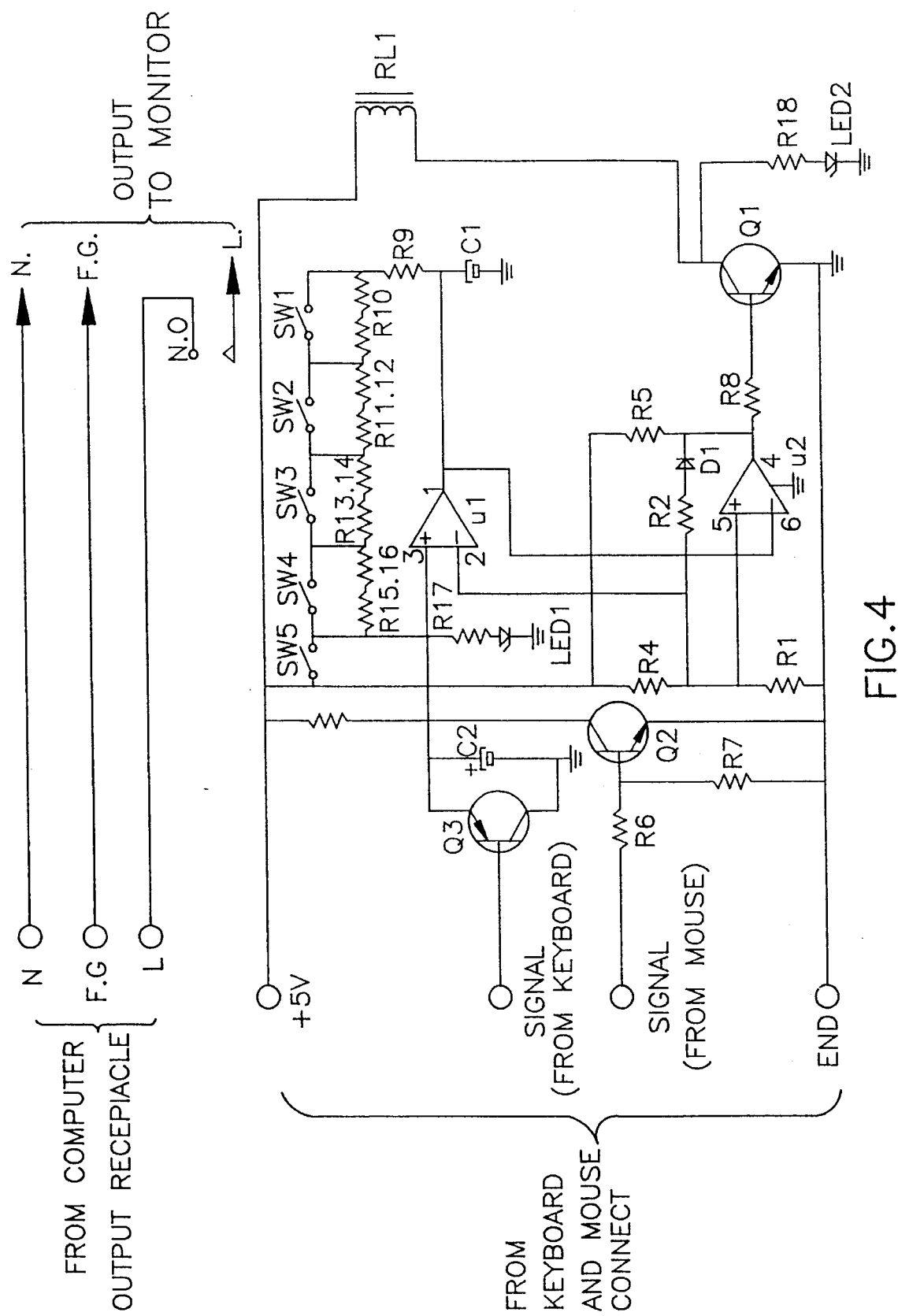
FIG. 4 is a circuit diagram of the preferred embodiment of the present invention.

Referring to FIG. 1, the monitor power saving device according to the present invention includes a pair of input sensor circuits 10A, 10B, a timer 20, and an AC power controller 30. The two input sensor circuits 10A, 10B are respectively coupled to the keyboard and the mouse of the computer. The timer 20 is preset with a time duration TD. If after this time duration TD the input sensors 10A, 10B detect no signals from either the keyboard or the mouse, the timer 20 sends out a power-off signal to the AC power controller 30, switching off the power output to the monitor. After that, whenever the input sensors 10A, 10B detect an input signal from either the mouse or the keyboard, a power-on signal will be sent to the power controller 30 to switch on the power output to the monitor again.

Referring to FIG. 4, during idle the keyboard maintains a HIGH voltage and the mouse maintains a LOW voltage. This causes Pin 3 of the comparator U1 to be at HIGH voltage, which is greater than the reference voltage at Pin 2 thereof. The output of Pin 1 of the comparator U1 is thus HIGH, causing the capacitor C1 to be charged through the resistors R9 to R16. After the time duration TD, Pin 6 of the comparator U1 is higher in voltage than Pin 5, causing Pin 4 to go to the LOW voltage. Meanwhile, due to the resistor R2 and diode D1, Pin 5 of the comparator U2 will go to the LOW voltage. This causes the voltage at Pin 6 even greater than Pin 5, which can prevent the transistor Q1 from on-off jiggers. When Pin 4 of the comparator U2 goes to the LOW voltage, the transistor Q1 will deactivate the relay RL1, thereby cutting off the AC power to the monitor.

Referring to FIGS. 2 and 4, when the user touches the keyboard, a train of negative pulses is generated; and the user clicks the mouse button, a train of positive pulses is generated. Either train of pulses will cause Pin 3 of the comparator U1 to go to the LOW voltage and to thereby be lower than the reference voltage at Pin 2 thereof. This in turn causes Pin 1 to go also to the LOW voltage, thereby discharging the voltage on the capacitor C1. Since the width of these pulses is not large, the capacitor C2 is additionally used for more time delay, allowing the capacitor C1 to have sufficient time for the discharging. After discharging, Pin 6 of comparator U2 is lower in voltage than Pin 5. Pin 4 of comparator U2 thus goes to the HIGH voltage and thus causes the transistor Q1 to activate the relay RL1. Power is thereby transmitted to the monitor.

In the circuit diagram of FIG. 4, the resistors R9–R16 and capacitor C1 are used to determine the time constant RC. Users can change the value of RC by shortening any of the resistors R10–R16 by means of the switches SW1–SW4. The switch SW5, when on, initiates the charging of the capacitor C1 and thus it determines whether the power saving function is enabled or not.

The capacitor C2 is used for time delay purpose, which prolongs the discharging time of C1.

The transistor Q3 is used as amplifier for detecting if the keyboard is touched; and the transistor Q2 is used as inverter amplifier for detecting if the mouse is clicked or moved.

The light emitting diode LED1 is used to indicate whether the power-saving function is enabled or not. When it is lit, the function is enabled. The other light emitting diode LED2 is used to indicate status of the monitor screen. When it is lit, the screen is off; and when not lit, the screen is under operation.

FIGS. 3A and 3B show two preferred embodiments of the present invention. The embodiment of FIG. 3A uses relay RL1 and transistor Q1 for controlling the power input; while the embodiment of FIG. 3B uses a triac and timer for the same purpose. These two embodiments can effectively control the power input to the monitor. Other equivent devices may also be used to attain to the same function and purpose as mentioned above.

The present invention has been described hereto with an exemplary preferred embodiment. However, it is to be understood that the scope of the present invention need not be limited to the disclosed preferred embodiment. On the contrary, it is intended to cover various modifications and similar arrangements within the scope defined in the following appended claims. The scope of the claims should be accorded the broadest interpretation so as to encompass all such modifications and similar arrangements.

What is claimed is:

1. On a computer having a monitor, a computer monitor power saving device for switching off power delivery to the monitor when no user-input signal is received by the computer for a preset idle period, comprising:

(a) detection means, for detecting whether a user-input signal is being provided to the computer, said detection means generating a first voltage while no user-input signal is detected;

(b) a first comparator, for comparing the first voltage to a first preset reference voltage, and for generating an output voltage if the first voltage exceeds the first preset reference voltage;

(c) an RC circuit including a capacitor and a plurality of resistors, said RC circuit having a time constant preset to such a value that a voltage of said capacitor is charged by the output voltage of said first comparator to equal a second preset reference voltage after the preset idle period is elapsed;

(d) a second comparator, for comparing the voltage of said capacitor to the second preset reference voltage, and for generating a power-off signal when the voltage of said capacitor exceeds the second preset reference voltage; and (e) switch means, responsive to the power-off signal, for disconnecting the power delivery to the monitor.

2. A computer monitor power saving device as claimed in claim 1, wherein said detection means includes a transistor connected in parallel with a capacitor for detecting user-input from a keyboard of the computer.

3. A computer monitor power saving device as claimed in claim 1, wherein said detection means includes a transistor for detecting user-input from a pointing-device of the computer.

4. A computer monitor power saving device as claimed in claim 1, wherein said resistors in said RC circuit are connected in series and each resistor is connected in parallel with a switch, whereby the preset idle time is selectively adjustable by closing said switches to adjust the time constant of said RC circuit.

5. A computer monitor power saving device as claimed in claim 1, wherein the first preset reference voltage is equal to the second preset voltage.

6. A computer monitor power saving device as claimed in claim 1, wherein said switch means includes a transistor and a relay.

7. A computer monitor power saving device as claimed in claim 1, wherein said switch means includes a triac.

* * * * *